Dec. 23, 1969  E. M. BURGER  3,485,908
METHOD FOR MOLDING ELONGATED ELASTOMERIC ARTICLES
Filed Dec. 9, 1966  2 Sheets-Sheet 1
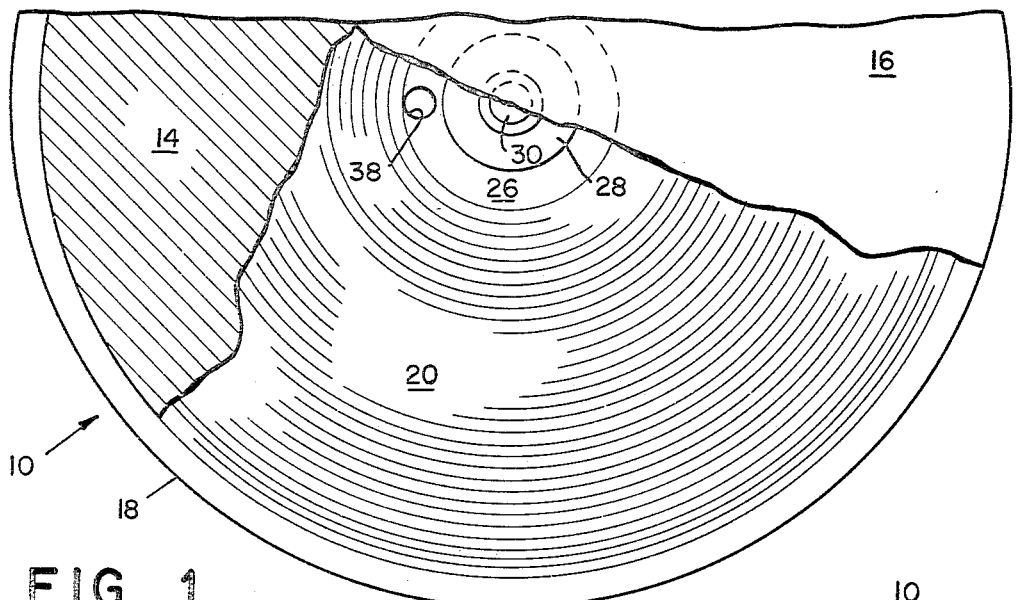
FIG_1
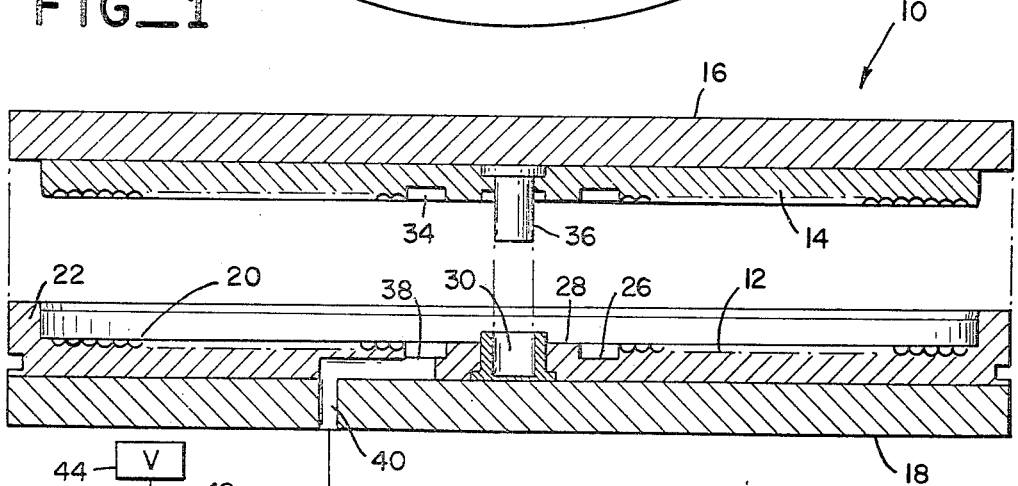
FIG_2
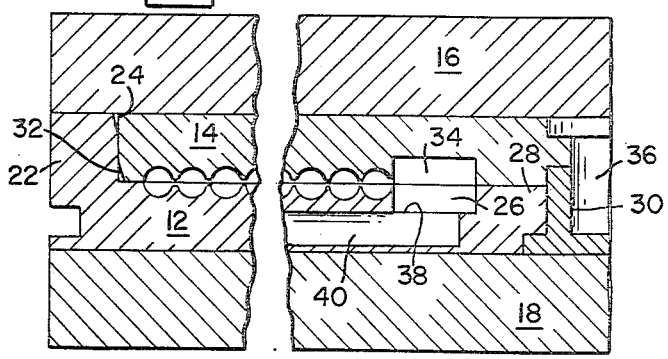
FIG_3
INVENTOR.
EDWIN M. BURGER
BY
Owen, Wickersham & Erickson
ATTORNEYS Dec. 23, 1969  E. M. BURGER  3,485,908
METHOD FOR MOLDING ELONGATED ELASTOMERIC ARTICLES
Filed Dec. 9, 1966  2 Sheets-Sheet 2
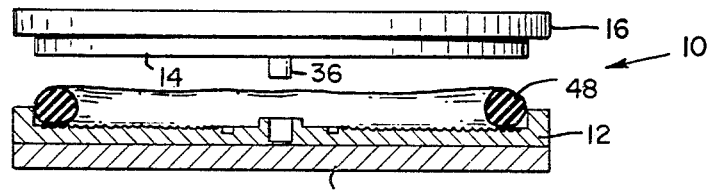
FIG_4A
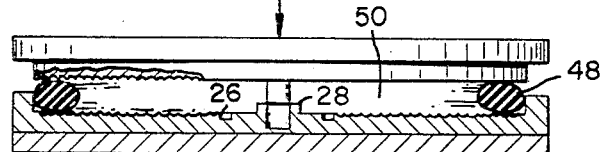
FIG_4B
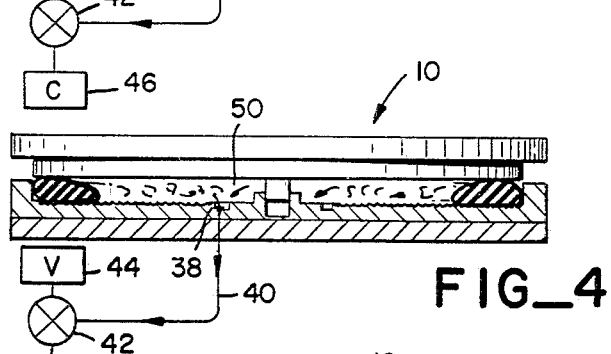
FIG_4C
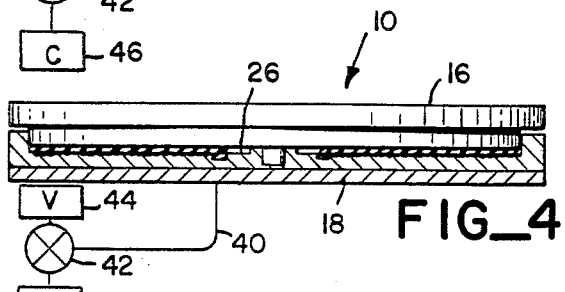
FIG_4D
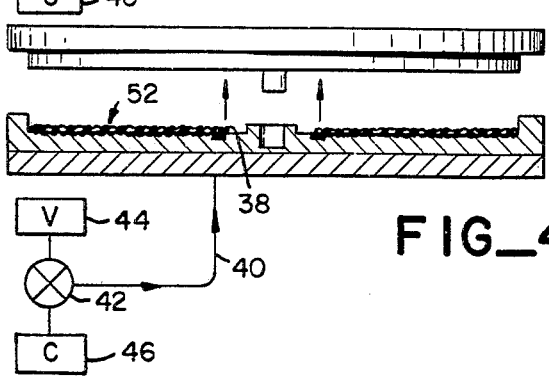
FIG_4E
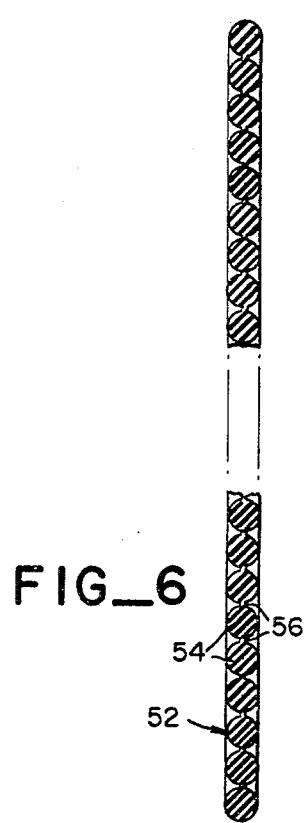
FIG_6
FIG_5
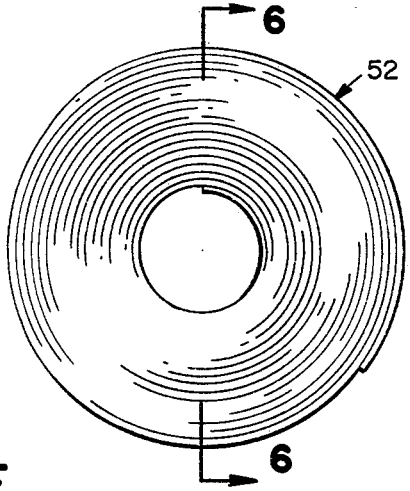
INVENTOR.
EDWIN M. BURGER
BY
Owen, Wickersham & Erickson
ATTORNEYS United States Patent Office 3,485,908
Patented Dec. 23, 1969

3,485,908
METHOD FOR MOLDING ELONGATED
ELASTOMERIC ARTICLES
Edwin M. Burger, Walnut Creek, Calif., assignor to Oliver Tire & Rubber Company, Oakland, Calif., a corporation of California
Filed Dec. 9, 1966, Ser. No. 600,409
Int. Cl. B29h 7/16, 5/01; B29g
U.S. Cl. 264—102
2 Claims

ABSTRACT OF THE DISCLOSURE

A method is presented for molding elongated elastomeric articles in the form of a spiral biscuit. A green rubber ring is formed and placed around the periphery of a mold. When the mold halves are brought together, the ring provides an air tight seal for the area between the mold halves and this area is evacuated to remove air and gases during the molding.

---

This invention relates to a method for molding relatively long and narrow elastomeric products, and more particularly, for molding such products in a flat spiral configuration.

In the installation of various forms of piping, such as the well-known concrete bell and spigot type, a circular solid rubber gasket is widely used as a sealing member at each pipe joint. To provide adequate sealing the cross section of such gaskets must be uniform whether it be round or some other shape. Also, the gaskets must have the proper length to match the particular size and type of pipe on which they are installed. For larger pipes, the length of the gasket material required is considerable, and also the variations in sizes and types of pipe are considerable. Accordingly, a large range of gasket sizes are required, but to provide a separate mold to make such a large gasket for each size required is impractical. Prior to the present invention it became apparent that for such large gaskets a more practical approach would be to form long lengths of gasket material of uniform cross section and then cut smaller portions to the proper length and splice the ends together when a particular gasket size was required. However, a problem arose in providing the long lengths of gasket material having a cross section that maintained a uniformity within close tolerances. The extrusion process for forming such long sections of gasket material proved to be unsatisfactory. This was due to the inherent problem with elastomeric compounds of controlling the cross-sectional size and shape during the extrusion process.

The general object of the present invention is to overcome the aforesaid problems by providing a method for producing elongated gasket material having the high degree of dimensional precision inherent in molded products, as well as an internal quality evidenced by uniform strength and appearance heretofore unattainable by extrusion methods.

It is also an object of the present invention to provide a molding method for producing elongated gasket material of a uniform cross section in the form of a relatively flat coil or spiral with each coil of the gasket being held together by a thin web so that it can be easily cut and the gasket material unwound.

Another object of the present invention is to provide a method for producing molded gasket material that eliminates the problem of removing gases from the mold as the molding process takes place, thereby enabling a firm, bubble-free product to be produced in a minimum of time.

A more specific object of the invention is to provide a molding method for forming a relatively flat biscuit having a spiral configuration wherein the material to be molded is formed in the shape of a ring and is positioned near the periphery of one of the mold halves and functions to form an airtight seal during the molding process. This unique procedure enables the vacuum to be drawn at the center of the mold cavity. Thus, as the mold halves come together the material is pressed from its original ring shape and flows radially inwardly over the adjacent recesses and the gases released from the material are quickly removed. The result is a product that is uniform in texture, free from bubbles or voids, and therefore strong and durable and uniform in size and elasticity.

Other objects, advantages and features of the present invention will become apparent from the following detailed description taken with the accompanying drawings in which:

FIG. 1 is a fragmentary plan view of the molding apparatus with a portion broken away to show the upper surface of the lower mold plate;

FIG. 2 is an exploded view in elevation and in section of the molding apparatus shown in FIG. 1;

FIG. 3 is an enlarged fragmentary view in elevation and in section showing the mold halves of the apparatus in FIGS. 1 and 2 in the closed position;

FIGS. 4A–4E show progressively the method steps according to the present invention;

FIG. 5 is a plan view showing the elastomeric product after it has been removed from the mold;

FIG. 6 is an enlarged view in section taken along the line 6—6 of FIG. 5.

In the drawings, FIGS. 1 and 2 show a molding apparatus 10 embodying the principles of the present invention comprising a pair of mold plates 12 and 14 of the type used for producing a large but relatively thin molded rubber product such as an elongated article arranged in a flat, spiral configuration. The mold plates are fixed to upper and lower platens 16 and 18, one of which is fixed, the other being movable relative thereto, as in a conventional molding apparatus. The lower mold plate 12 has a base cavity section 20 which is circular in plan form and is surrounded by a cylindrical wall portion 22 at its periphery that extends above the base cavity section. As shown in FIG. 3, the inner upper edge 24 of the wall portion 22 is chamfered slightly. Extending radially inwardly from the wall portion on the upper surface of the base cavity section provides a series of recessed areas forming the spiral pattern and thus the lower half of the product being molded. This pattern of recessed areas terminates at the edge of a relatively large annular groove 26 that is spaced radially from a central hub 28 of the lower mold plate. The latter has a central, cylindrical cavity 30 and is adapted to receive a mating cylinder portion in the upper mold cavity.

The upper mold plate 14 is adapted to fit within the wall portion 22 of the lower mold plate 12 and therefore has an outer diameter only slightly less than the inside diameter of this wall portion. The outer edge 32 of the upper mold cavity is also chamfered in the same manner as the edge 24 of the wall portion and thus helps the two plates to come together with a minimum of interference.

The surface of the upper mold plate 14 is provided with a cavity pattern that matches that of the lower mold plate to form the spiral configuration of an elongated article having a desired cross section. Adjacent the inner edge of the cavity pattern is an annular groove 34 which has the same size as the groove 26 in the lower mold plate. Projecting downwardly from the center of the upper plate 14 is a cylindrical hub member 36 which is aligned to fit within the cavity 30 of the hub 28 of the lower mold plate and thus to maintain the register of the mold cavities of the upper and the lower plates as they come together.

In the lower mold plate 12, which is attached to the fixed platen 18, a port 38 is provided in the annular groove 26 which is connected through a conduit 40. The latter extends outside of the mold plate to a valve 42 which connects the conduit alternatively to either a vacuum pump 44 or a source of compressed air 46, as shown schematically in FIG. 2.

The method for producing a large circular but relatively thin molded rubber product utilizing the aforesaid apparatus may now be described with reference to FIGS. 4A–4E. In FIG. 4A, the mold halves 12 and 14 are shown in their initial spaced apart position and within the mold is a ring of green rubber 48. The green rubber is placed near the periphery of the lower mold 12 against the circular wall portion 22 extending around its outer edge. As shown, the green rubber ring may extend above the wall so that as the upper mold plate descends, as in FIG. 4B, it initially engages the green rubber ring. When the upper mold plate engages the green rubber ring 48 and continues to push downwardly toward the lower mold half, the valve 42 is open to the vacuum pump 44 so that air and gases are withdrawn from the central area 50 of the mold cavity. At this stage of my method, I have formed and positioned the green rubber ring so that it will serve as a sealing member. Thus, the mold is airtight and gases that are normally forming during the molding process can be readily removed from inside the mold by the vacuum pump. This sealing continues as the upper mold half moves closer to the lower mold half and during this closing period the force applied to the mold plates may be varied to produce a web between each spiral of the desired thickness. As the green rubber ring is compressed, it flows inwardly over the mold cavities and gases that normally would remain as bubbles within the green rubber, are readily removed. When the mold halves are completely together so that all of the cavities forming the spiral product configuration are filled, as shown in FIG. 4D, a flashing of excess rubber is left in the inner annular ring 26. The mold plates are now held together while the rubber between them is cured as it is subjected to a preselected temperature and pressure. These factors may vary according to the type of rubber compound used and the results desired. Once the product within the mold has been properly cured, the mold halves are readily separated to remove the product by operation of the valve 42 which shuts off the vacuum and replaces it by compressed air source that forces air into the annular chamber of the mold and pushes the mold halves apart.

The gasket material produced by the aforesaid apparatus and method, as shown in FIGS. 5 and 6, is in the form of a relatively flat, biscuit-like product 52 comprising a spirally wound, elongated article of uniform cross section. The molding operation, as previously described, is so effective in removing the gases that normally are formed during molding operations that an unusually smooth and solid product results and size tolerances can be held to very close values. In the product, the elongated, spirally wound larger section 54 is held together in each coil by a small web 56. This web will serve to keep the material in its spiral form for shipment and handling but can easily be cut to facilitate unwinding and removal of the material in its elongated form when gaskets or the like are to be made from the material.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A method for molding an elongated rubber article in the form of a flat spiral with each coil in the same plane and joined together by a web, said method comprising the steps of:

providing upper and lower mold plates each having base surfaces with spiral cavities that register to form a flat coil of an elongated product having a predetermined uniform, cross section;

one of said mold plates having a peripheral wall extending above its base surface, the other said mold plate being adapted to fit within said wall;

providing an amount of green rubber material to be molded having generally a toroidal shape;

placing said green rubber material around the outer edge of said mold plate having said wall;

bringing the other mold plate into contact with said green rubber material to form an airtight seal around said mold plates;

applying a vacuum to the space between said mold plates within said ring; and forcing said mold plates together while said vacuum is maintained to cause said material to flow radially inwardly and fill said spiral cavities as the gases between said mold plates are removed by the vacuum.

2. A method as defined in claim 1 further including the step of maintaining said upper and lower mold plates together for a preselected time period at a predetermined temperature after the spiral cavities thereof have been filled with green rubber material to thereby cure the rubber material, and then severing the web of material between the coils of the spiral to form the elongated rubber product.

References Cited

UNITED STATES PATENTS

| | | | |
|---|---|---|---|
| 1,190,072 | 7/1916 | Aiken. | |
| 1,353,522 | 9/1920 | Emerson | 264—107 |
| 2,772,012 | 11/1956 | Crabtree | 264—102 X |
| 3,193,884 | 7/1965 | Haynie et al. | |
| 3,341,647 | 9/1967 | Aberle | 264—325 |
| 1,978,041 | 10/1934 | Dodge | 264—147 X |

FOREIGN PATENTS

| | | |
|---|---|---|
| 538,877 | 4/1957 | Canada. |

ROBERT F. WHITE, Primary Examiner

S. H. SILBAUGH, Assistant Examiner

U.S. Cl. X.R.

18—5.3, 42; 264—107, 138, 325